(12) United States Patent
Yamaguchi et al.

(10) Patent No.: US 7,405,505 B2
(45) Date of Patent: Jul. 29, 2008

(54) ROTARY ELECTRIC MACHINE

(75) Inventors: Shinichi Yamaguchi, Tokyo (JP); Haruyuki Kometani, Tokyo (JP); Chiyo Fujino, Tokyo (JP); Tomohiro Kikuchi, Tokkyo (JP); Takashi Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 412 days.

(21) Appl. No.: 10/567,354

(22) PCT Filed: Aug. 5, 2004

(86) PCT No.: PCT/JP2004/011253
§ 371 (c)(1), (2), (4) Date: Feb. 6, 2006

(87) PCT Pub. No.: WO2005/022719
PCT Pub. Date: Mar. 10, 2005

(65) Prior Publication Data
US 2008/0106164 A1 May 8, 2008

(30) Foreign Application Priority Data
Sep. 1, 2003 (JP) ............................ 2003-308373

(51) Int. Cl.
*H02K 5/04* (2006.01)

(52) U.S. Cl. .......................... 310/258; 310/64; 310/89

(58) Field of Classification Search .................... 310/64, 310/89, 258
See application file for complete search history.

(56) References Cited

U.S. PATENT DOCUMENTS 4,742,257 A * 5/1988 Carpenter .................... 310/62

(Continued)

FOREIGN PATENT DOCUMENTS

| JP | 61-15544 | 1/1986 |
|---|---|---|
| JP | 2000-245124 | 9/2000 |
| JP | 2001-095199 | 4/2001 |

OTHER PUBLICATIONS

Gotou Kobayashi, "An Analysis of the Cogging Torque of a DC Motor and New Reducing Technique", IEEJ Transactions on Power and Energy, vol. 103-B, pp. 711-718, 1983.

*Primary Examiner*—Tran Nguyen
(74) *Attorney, Agent, or Firm*—Leydig, Voit & Mayer, Ltd.

(57) ABSTRACT

A rotary electric machine includes a frame; a stator whose stator-slot number Ns is 12; a rotor whose rotor-pole number Np is 8, the rotor being disposed inside the stator. The frame has a frame thickness $T(\theta)$ at mechanical angle $\theta$, with respect to a reference line that connects the inner circumferential center of the frame with an arbitrary point, other than the center, around the center that is circularly expanded in a Fourier series. The difference between the stator-slot number Ns and the rotor-pole number Np is k (=|Ns−Np|). Stress-relieving spaces and are located in portions of the frame in an arrangement that does not have 90-degree mechanical angle rotational symmetry, in such a way that the sum P of inclusion ratios for the k-th component $T_k$ and the Np-th component $T_{Np}$, which are the Fourier series expansion coefficients for the frame thickness $T(\theta)$ expressed by equation (2)

$$P = (T_k + T_{Np}) \Big/ \sum_{n=0}^{\infty} T_n \times 100[\%], \qquad (2)$$

is less than 12%. According to this configuration, mechanical strength of the frame and its producibility are maintained, and cogging torque caused by magnetic-circuit distortion in an iron core generated due to the frame shape is also reduced.

6 Claims, 20 Drawing Sheets

U.S. PATENT DOCUMENTS 5,008,575 A * 4/1991 Ishimoto et al. ............... 310/89
5,630,461 A * 5/1997 CoChimin ................... 164/34
6,011,335 A * 1/2000 Belley ........................ 310/89
2002/0180282 A1 12/2002 Suzuki et al.

* cited by examiner

ROTARY ELECTRIC MACHINE

TECHNICAL FIELD

The present invention relates to rotary electric machines having a frame, and particularly to frame shapes.

BACKGROUND ART

As one of contributing factors toward cogging-torque generation, asymmetrical magnetic characteristics (magnetic-circuit distortion) around the center of a rotor-rotating axis can be pointed out, which is caused by a stress distribution in a stator core (hereinafter occasionally referred to as a stator iron core) with respect to the rotor-rotating direction (hereinafter occasionally referred to as simply the rotating direction). Such stress distribution in the stator core is considered to be caused by non-uniform constriction using a frame. This is mainly caused by the irregularity of the thickness of the frame around the rotor rotating axis. Generally, a rectangular frame (a frame in which the edge-shape is a rectangular pillar) tends to have mainly been used, resulting mainly in the stress generation due to the irregularity of the thickness.

Regarding a conventional rotary electric machine in which the cogging torque caused by the magnetic-circuit distortion in the stator core is focused, in a servo-motor composed of a stator having a metal frame, a rotor disposed in a space inside the stator, and a housing having the loading side and the non-loading side that rotatably support the rotor at both the ends of the rotor shaft, when the stator is produced by heat-shrink fitting in which the core is fitted in such a way that the metal frame is formed to have fins, the thickness of the frame main body at the bottoms of the fins is made approximately regular, an iron core is inserted into the metal frame after having been heated, then the metal frame is cooled, or produced by an adhesion method in which the metal frame and the iron core are fixed using a heat-curing adhesive, so that distortion given to the core and increase of the cogging torque are prevented (for example, refer to Patent Document 1).

[Patent Document 1]
Japanese Laid-Open Patent Publication 95,199/2001

DISCLOSURE OF THE INVENTION

Because the conventional rotary electric machine is configured as described above, in order to make the thickness of metal-frame main body (hereinafter occasionally referred to as the frame thickness) approximately regular in which the outer shape is rectangular, the structure of the frame needs to have fins that have 90-degree-mechanical-angle rotational symmetry (the identical shape repeats every 90 degree rotation ) because of the rectangular outer shape; consequently, problems have been that the mechanical strength of the frame falls short due to the thickness as a whole being made thinner, and its productivity deteriorates due to need for providing it with a plurality of fins.

An objective of the present invention, which has been made to solve the foregoing problems, is to provide a rotary electric machine that, while maintaining mechanical strength of the frame and its productivity, can reduce cogging torque caused by magnetic-circuit distortion generated in an iron core due to the frame shape.

A rotary electric machine according to the present invention includes: a frame; a stator whose stator-slot number Ns is 12; a rotor whose rotor-pole number Np is 8, the rotor disposed in a space inside the stator; and given that frame thickness T(θ) at mechanical angle θ, with respect to a reference line that connects the inner circumferential center of the frame with an arbitrary point other than the center, around the center is circularly expanded in the Fourier series as expressed by equation 1

$$T(\theta) = \sum_{n=0}^{\infty} T_n \cos(n\theta + \phi_n) \quad (1)$$

(wherein n is 0, 1, 2, 3 ..., $T_n$ is the magnitude of the n-th component of the frame thickness when T(θ) is expanded in the Fourier series as in equation 1, and $\phi_n$ is the phase), and that the difference between the stator-slot number Ns and the rotor-pole number Np is k (=|Ns−Np|), stress-relieving spaces provided in portions of said frame in an arrangement that does not have 90-degree mechanical angle rotational symmetry, in such a way that the sum P of inclusion ratios for the k-th component $T_k$ and the Np-th component $T_{Np}$ that are the Fourier series expansion coefficients for the frame thickness T(θ) expressed by equation 2

$$P = (T_k + T_{Np}) \bigg/ \sum_{n=0}^{\infty} T_n \times 100 [\%] \quad (2)$$

falls under 12%.

The cogging-torque component related to the number of poles, generated by non-uniformity of stator-core stress distribution caused by the frame thickness asymmetry around the rotor rotating axis can be effectively prevented with the rotational asymmetry of the frame thickness being maintained.

BEST MODE FOR CARRYING OUT THE INVENTION

EMBODIMENT 1

Figure 1:
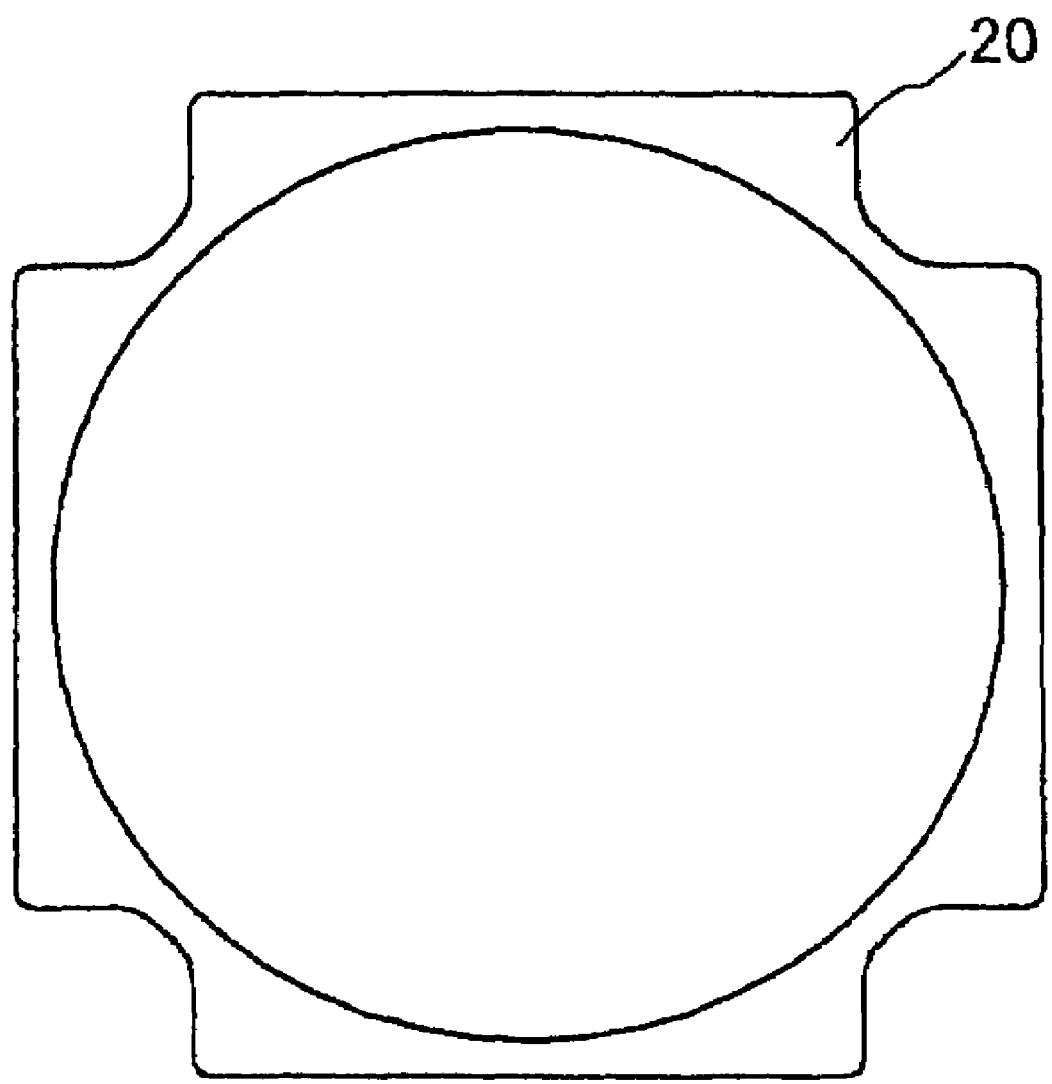
FIG. 1 is a front view illustrating a frame, according to Embodiment 1 of the present invention, in which stress-relieving spaces are not provided.
Figure 5:
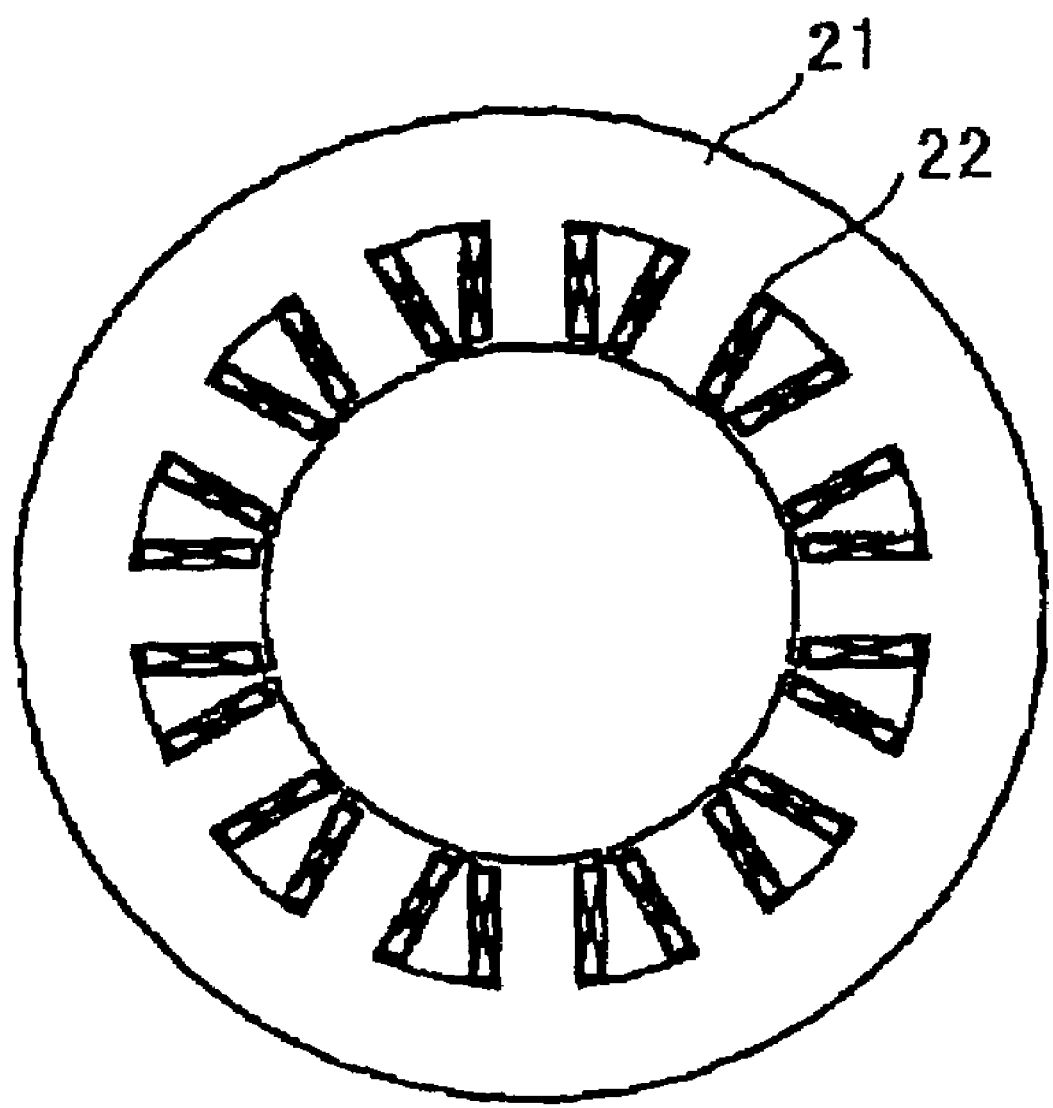
FIG. 5 is a front view illustrating a shape of a stator used in a rotary electric machine according to Embodiment 1 of the present invention.
Figure 6:
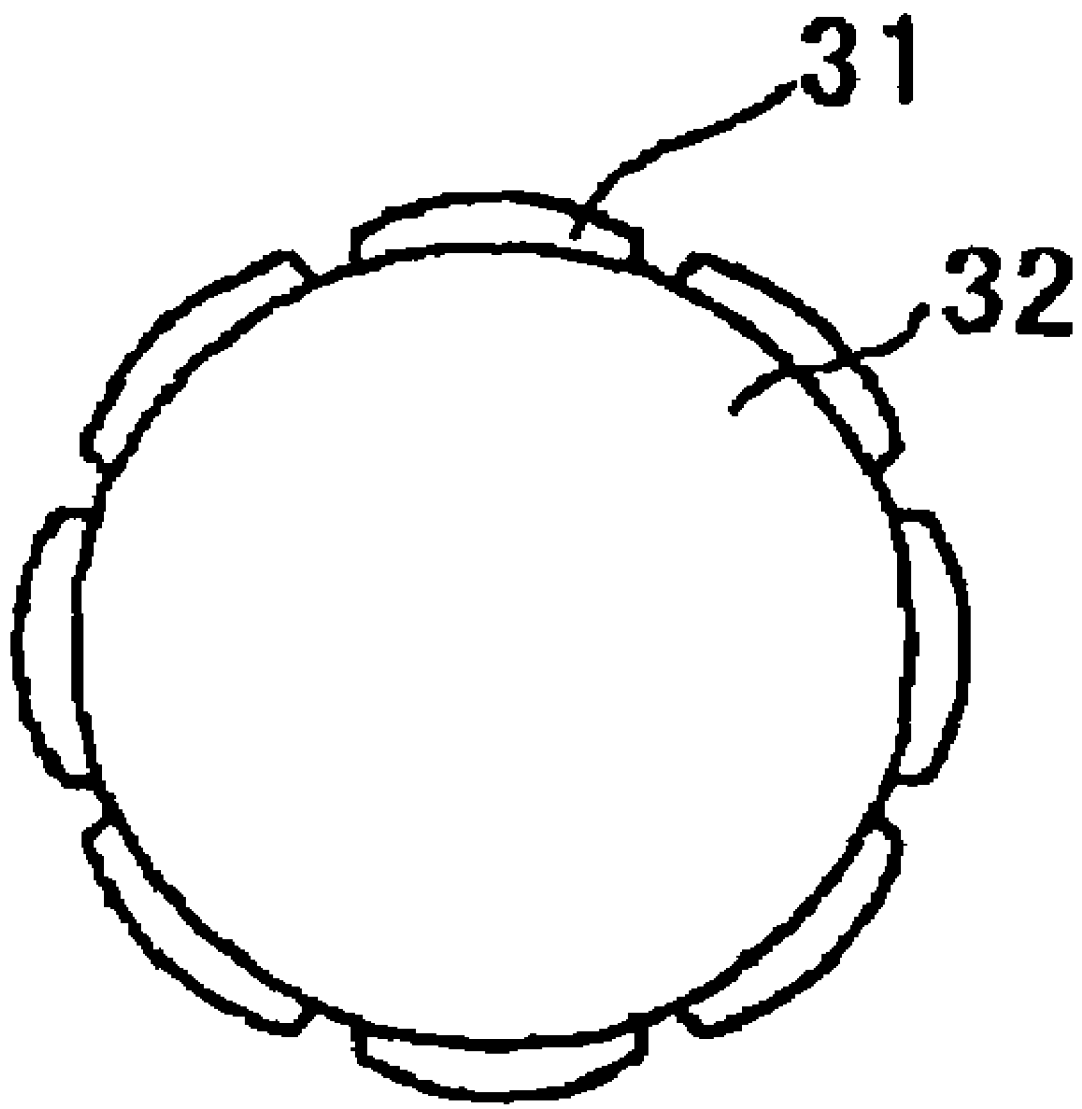
FIG. 6 is a front view illustrating a shape of a rotor used in the rotary electric machine according to Embodiment 1 of the present invention.

As a comparison reference illustrated in FIG. 1, the heat-shrink fitting of a stator iron core (a stator core) 21 in which the number of stator slots Ns is 12 as illustrated in FIG. 5 is performed into a metal (as an example, aluminum) frame 20 having no stress-relieving spaces, and a rotor in which the number of rotor poles Np is 8 as illustrated in FIG. 6 is installed, so that measurement of cogging-torque wave-forms and frequency analysis of the cogging-torque waveforms was performed. As a result, a cogging-torque component of eight peaks per rotation (an Np-th component) that is considered to be caused by a frame shape was observed to be relatively high. It is important to reduce the eight-peak component (the Np-th component) in the cogging-torque. Therefore, only the cogging-torque component of eight peaks per rotation (hereinafter occasionally referred to as simply a cogging-torque eight-peak component) is focused in the following description.

This cogging-torque eight-peak component generates when the magnetic characteristics (the permeance) of the stator core 21 has rotational asymmetry. The asymmetry of this stator core 21 is considered to stem from the fact that, non-uniformity of a stress distribution (hereinafter referred to as stress non-uniformity) around the rotor-rotating-shaft center in the stator arises caused by the thickness irregularity of the frame 20 arising, non-uniformity of the magnetic characteristics arises with this stress non-uniformity, and due to this stress non-uniformity, the rotational asymmetry (the distortion) has consequently arisen in the magnetic characteristics of the stator core 2.

Meanwhile, the cogging-torque component of eight peaks per rotation, according to the reason as described later, is considered to remarkably depend on the k-th component corresponding to the difference between the number of poles and the number of the slots, and on the Np-th component corresponding to the number of the rotor poles, among the Fourier series expansion coefficients with respect to the frame thickness.

As described above, focusing only on the cogging-torque eight-peak component, the following points have been discovered. The frame thickness is assumed to be given by T(θ) at mechanical angle θ around the center of the frame inner circumference with respect to a reference line that connects the center (a rotary electric machine is structured so that the center of a frame inner circumference and the center of a rotor rotating shaft agree with each other) with an arbitrary point other than the center. The sum P of the inclusion ratios of the k-th component $T_k$ and the Np-th component $T_{Np}$ was focused when this T(e) is circularly expanded in the Fourier series, and then a correlation between the sum and the magnitude of the cogging-torque eight-peak component has been investigated. Here, the number of the stator slots is Ns, the number of the rotor magnetic poles is Np, and the difference between them is k (=|Ns−Np|). Results related to each of frame shapes illustrated in FIG. 1-FIG. 4 are represented in table 1 and in FIG. 16.

Figure 2:
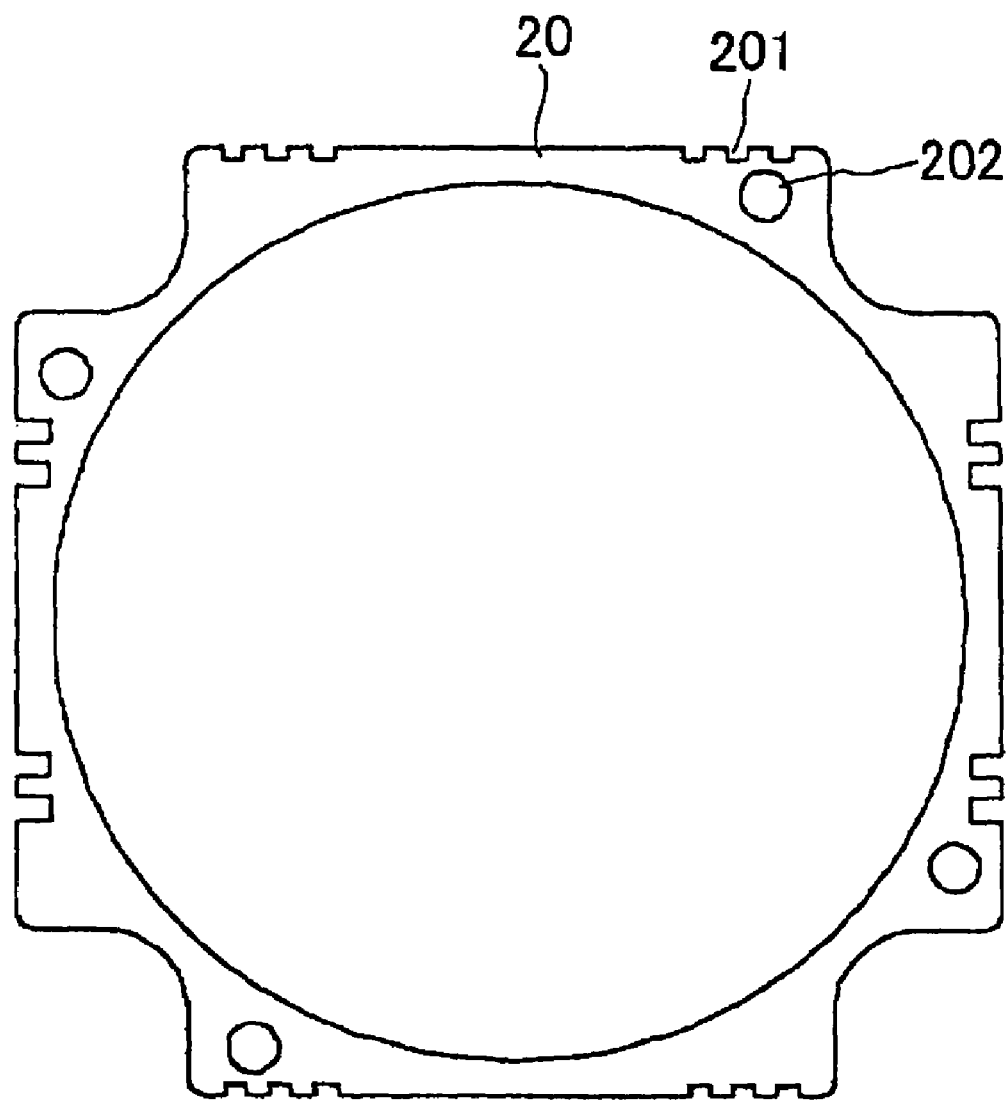
FIG. 2 is a front view illustrating an example of a frame, according to Embodiment 1 of the present invention, in which stress-relieving spaces are provided.
Figure 3:
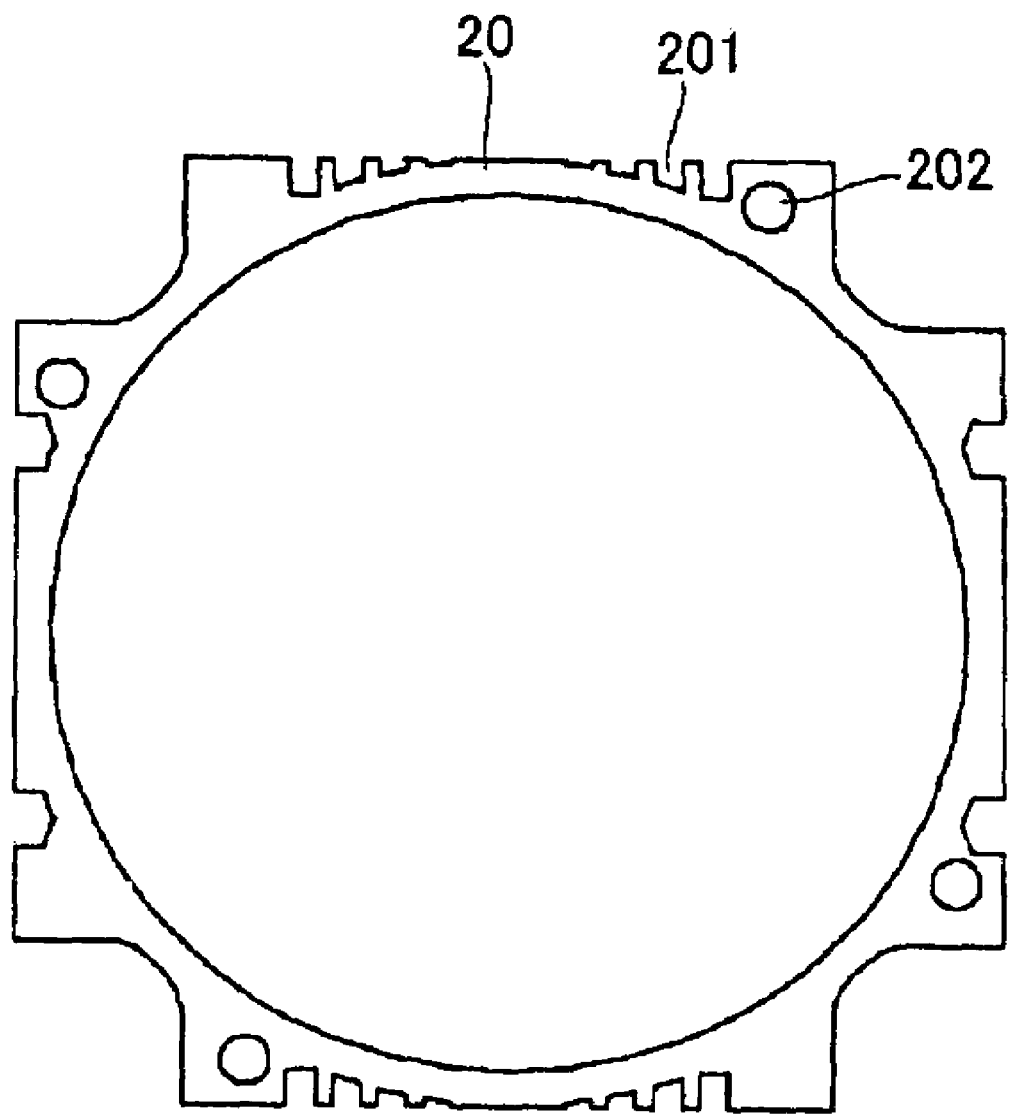
FIG. 3 is a front view illustrating another example of a frame, according to Embodiment 1 of the present invention, in which stress-relieving spaces are provided.
Figure 4:
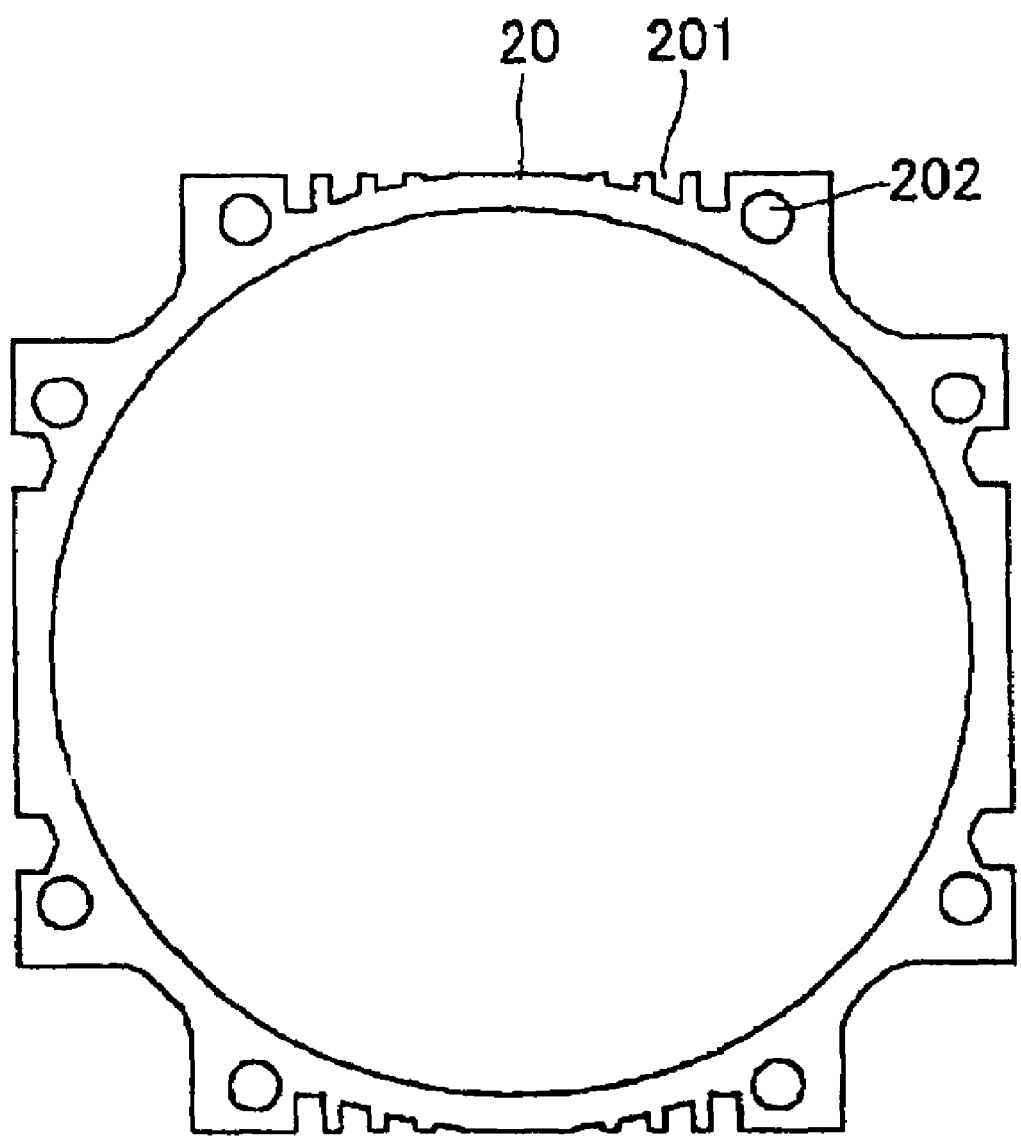
FIG. 4 is a front view illustrating still another example of a frame, according to Embodiment 1 of the present invention, in which stress-relieving spaces are provided.

The frame shapes illustrated in FIG. 1-FIG. 4 have been experimentally produced and evaluated here by the inventors of the present invention. As the frame 20, for example, a metal frame such as aluminum one is adopted, and, in a case of a servo-motor, for example, the outer shape of the frame 20 is generally designed so as to be approximately rectangular pillar (the outer cross-section in a plane orthogonal to the rotor rotating shaft or the centering axis of the frame inner circumference is approximately rectangular). In the frames illustrated in FIG. 1-FIG. 4, each of the outer cross-sections in a plane orthogonal to each of the rotor rotating shafts (the center axes of the frame inner circumferences) are approximately square. FIG. 1 represents a reference frame having no stress-relieving spaces, and FIG. 2-FIG. 4 represent cases in which stress-relieving grooves 201 at the outer edge portions of the frames 20, or stress-relieving holes 202 in the frames 20 are provided as the stress-relieving spaces, in order to reduce the cogging torque (the cogging torque that is caused by distortion of the iron-core magnetic circuit generated due to the frame shapes). Here, although the figures represent cases in which the stress-relieving holes 202 partially overlap with conventional bolt (or screw) holes, the cases in which the stress-relieving holes 202 do not overlap with the bolt (or screw) holes are also included. The stator iron core (stator core), as illustrated in FIG. 5, is heat-shrink fitted into these frames 20 so as to fix the rotor as illustrated in FIG. 6; then, the measurement of the cogging torque waveforms and the frequency analysis for the cogging-torque waveforms have been performed.

As illustrated in FIG. 5, the stator is configured in such a way that the stator main body having stator windings 22 wound onto the stator iron core 21 and 12 stator slots, is heat-shrink fitted to the frame 20. As a rotor that composes, together with the stator main body, the permanent-magnetic rotary electric machine main body, a rotor including a rotor iron core 32, a permanent magnet 31 and having 8 rotor poles, was used as illustrated in FIG. 6. Because a rotor having this number of poles is frequently produced, it is meaningful to take this rotor as an example of this embodiment. Moreover, although not illustrated in figures, a rotary electric machine according to this embodiment includes housings, on the load side and the opposite load side, that rotatably support the rotor from both ends of the rotor shaft.

Figure 7:
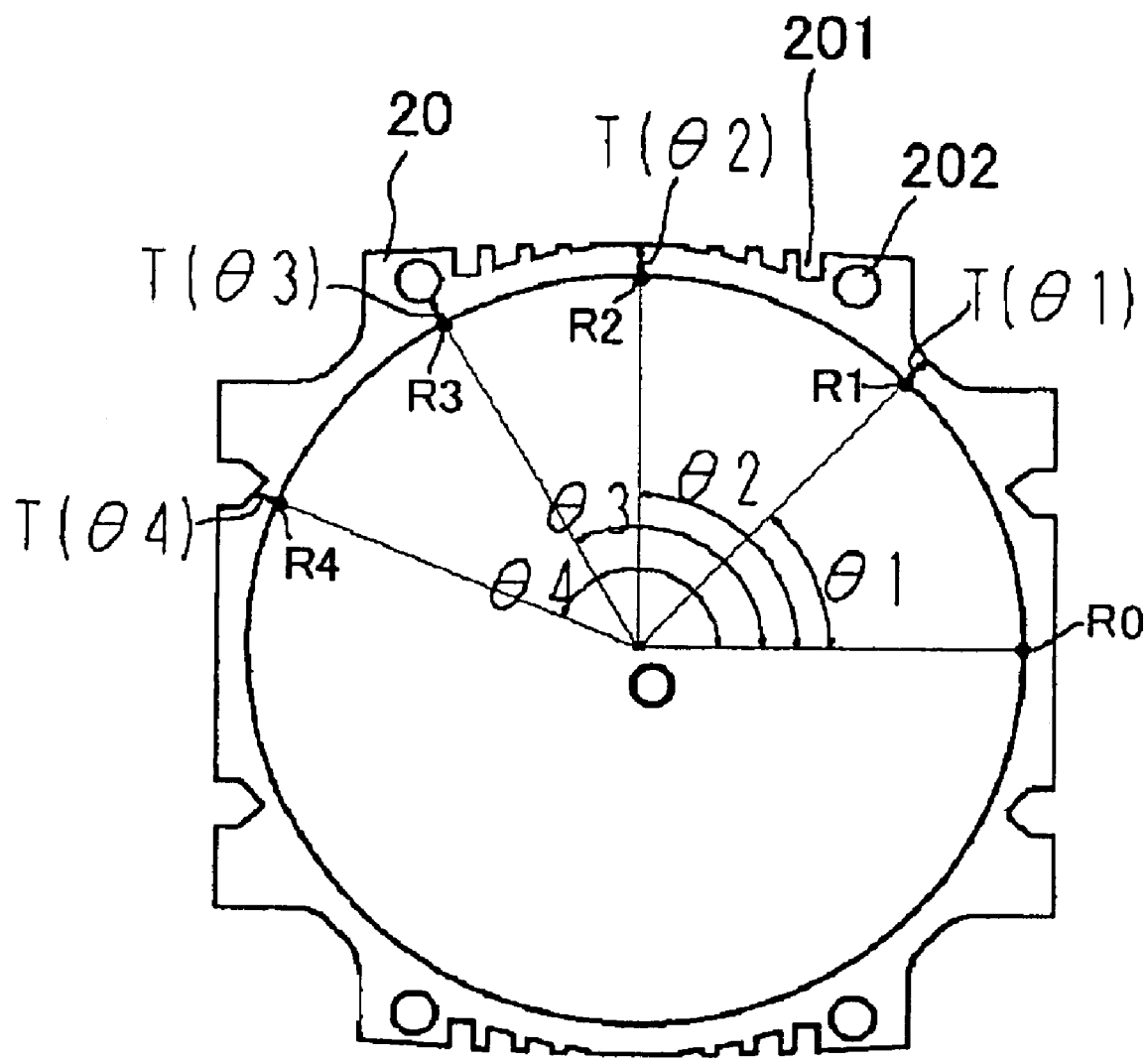
FIG. 7 is a view, according to Embodiment 1 of the present invention, explaining a relationship between a frame-position θ and frame thickness T(θ)
Figure 8:
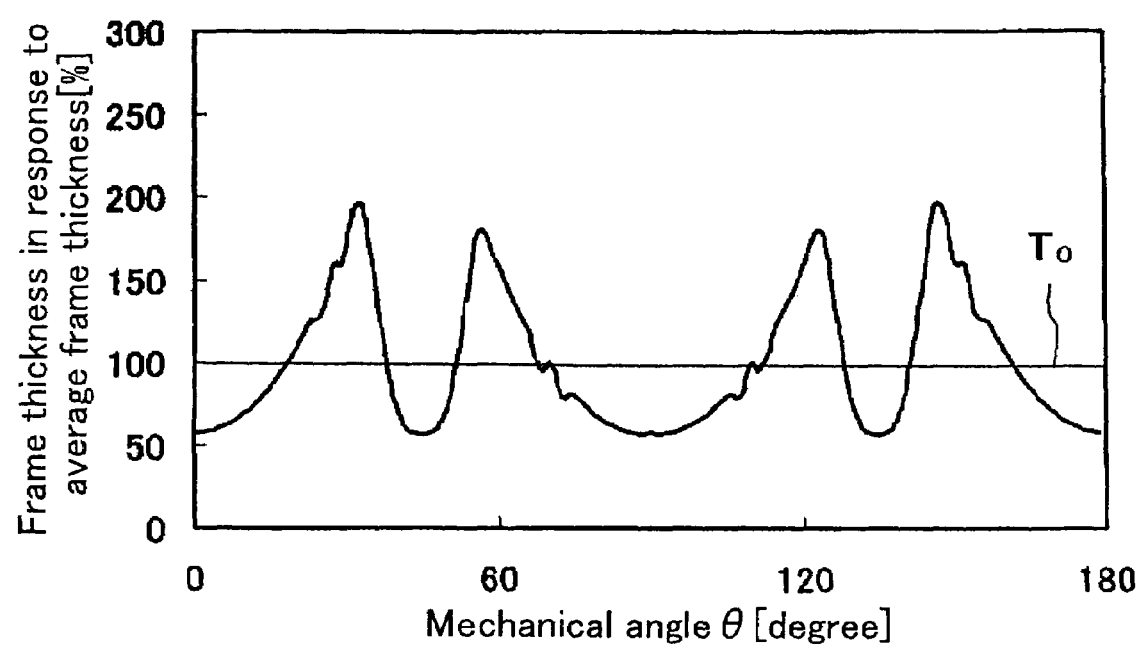
FIG. 8 is a curve graph, according to Embodiment 1 of the present invention, representing a percentage of frame thickness T(θ) at each frame-position θ in response to average frame-thickness of the frame in FIG. 1.
Figure 9:
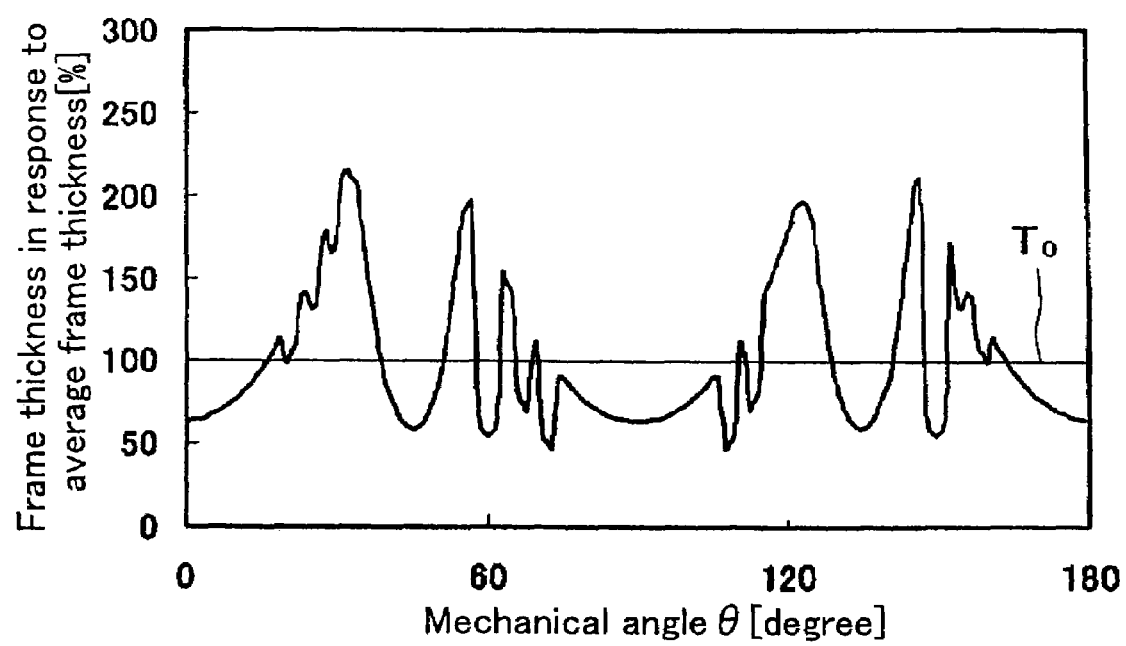
FIG. 9 is a curve chart, according to Embodiment 1 of the present invention, representing a percentage of frame thickness T(θ) at each frame-position θ in response to frame-average-thickness of the frame in FIG. 2.
Figure 10:
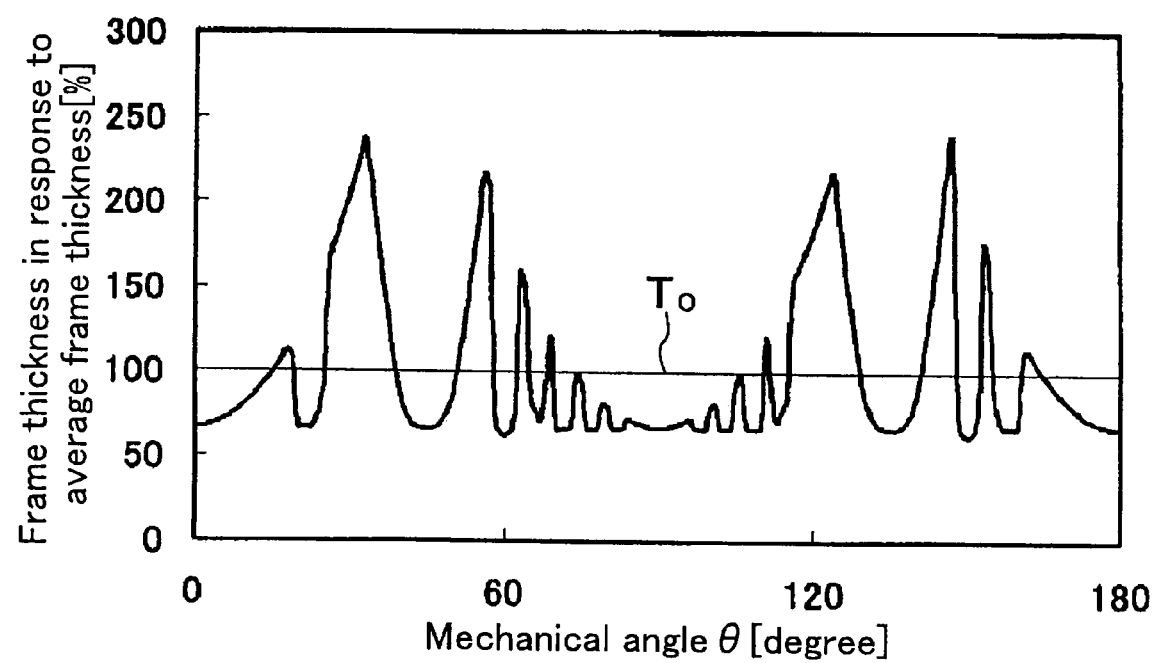
FIG. 10 is a curve graph, according to Embodiment 1 of the present invention, representing a percentage of frame thickness T(θ) at each frame-position θ in response to frame-average-thickness of the frame in FIG. 3.
Figure 11:
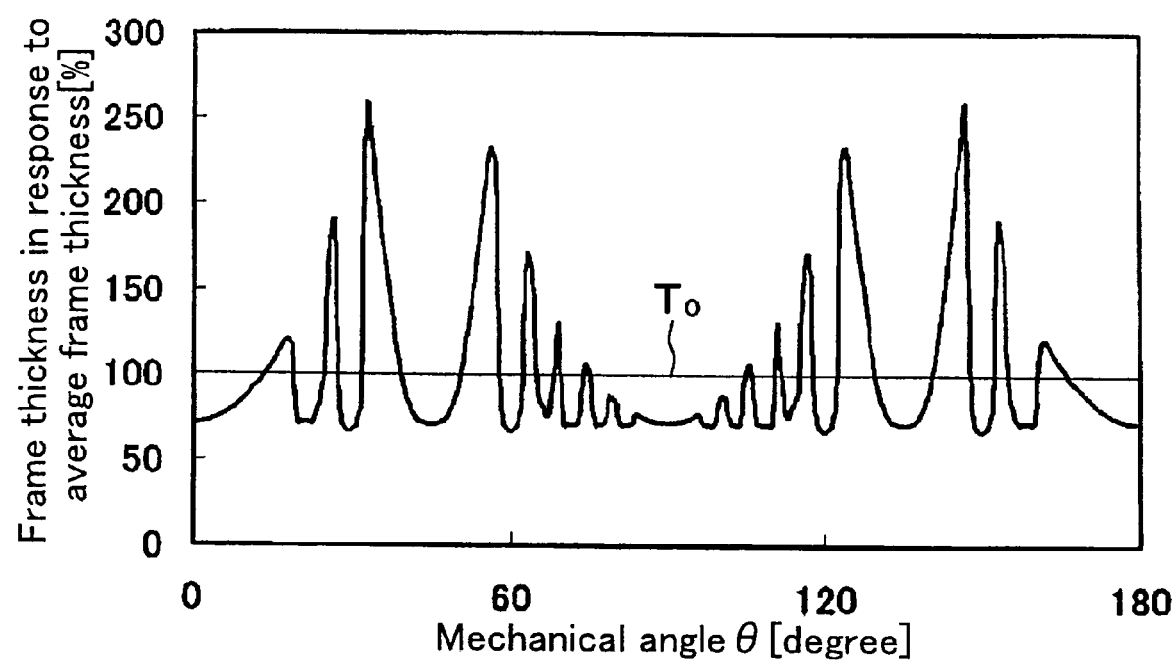
FIG. 11 is a curve graph, according to Embodiment 1 of the present invention, representing a percentage of frame thickness T(θ) at each frame-position θ in response to frame-average-thickness of the frame in FIG. 4.
Figure 12:
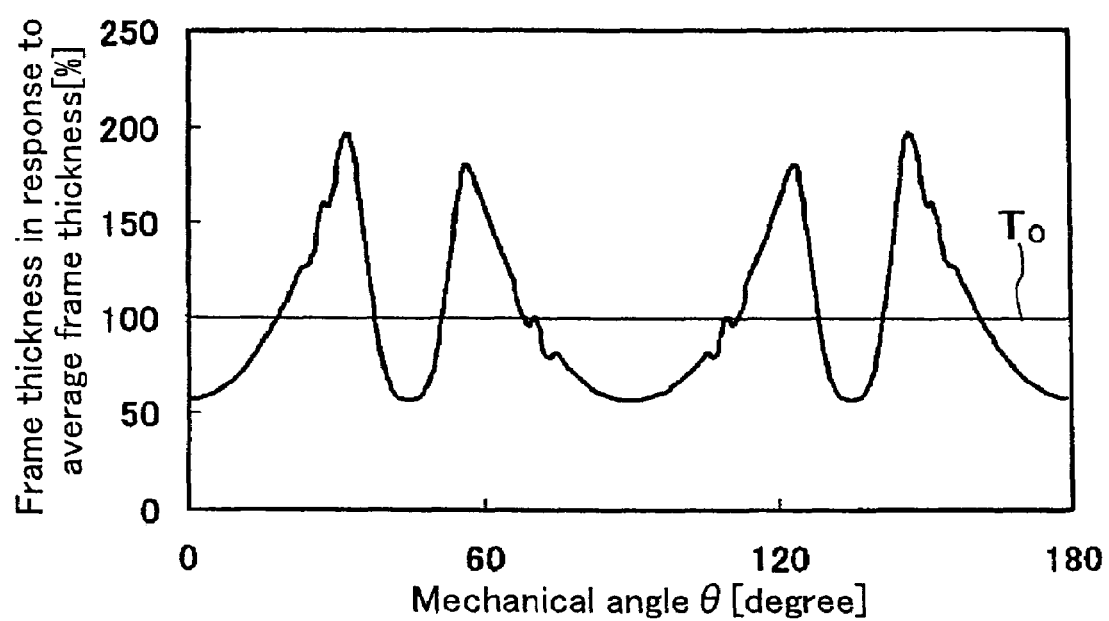
FIG. 12 is a curve graph, according to Embodiment 1 of the present invention, representing a percentage of effective frame thickness T(θ) at each frame-position θ in response to frame-average-thickness of the frame in FIG. 1.
Figure 13:
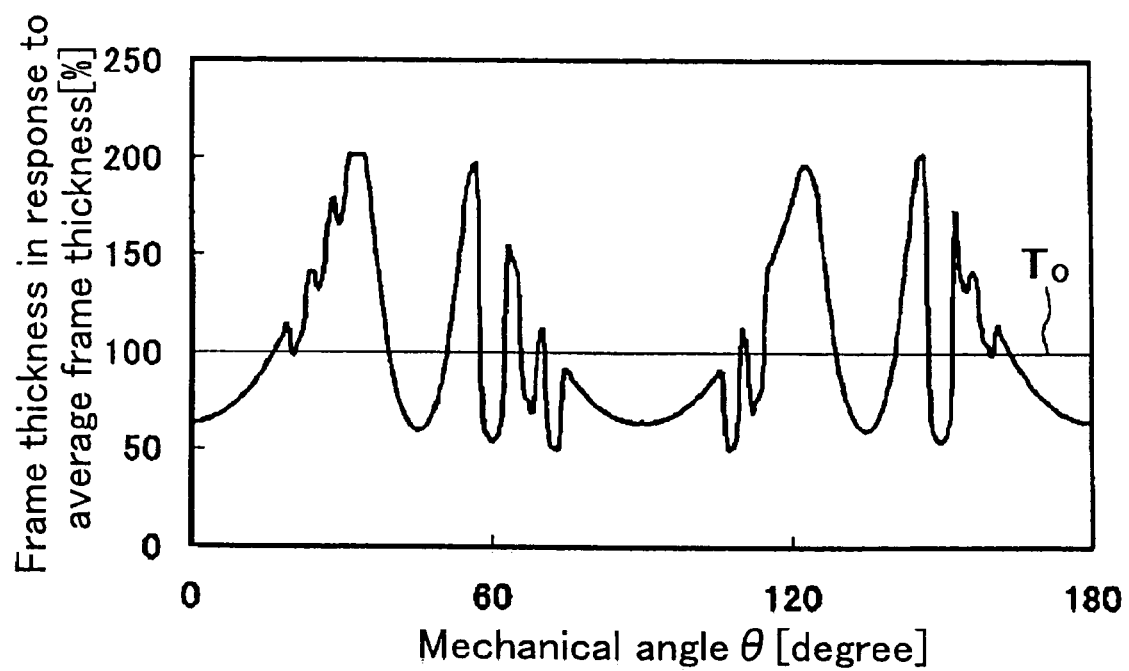
FIG. 13 is a curve graph, according to Embodiment 1 of the present invention, representing a percentage of effective frame thickness T(θ) at each frame-position θ in response to frame-average-thickness of the frame in FIG. 2.
Figure 14:
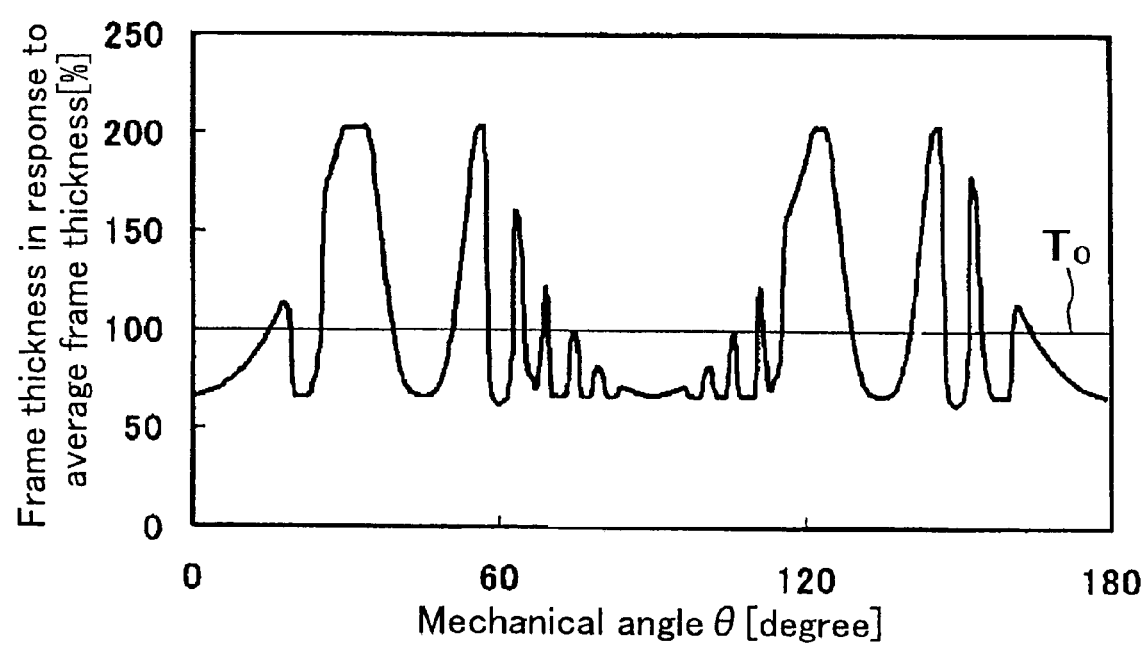
FIG. 14 is a curve graph, according to Embodiment 1 of the present invention, representing a percentage of effective frame thickness T(θ) at each frame-position θ in response to frame-average-thickness of the frame in FIG. 3.
Figure 15:
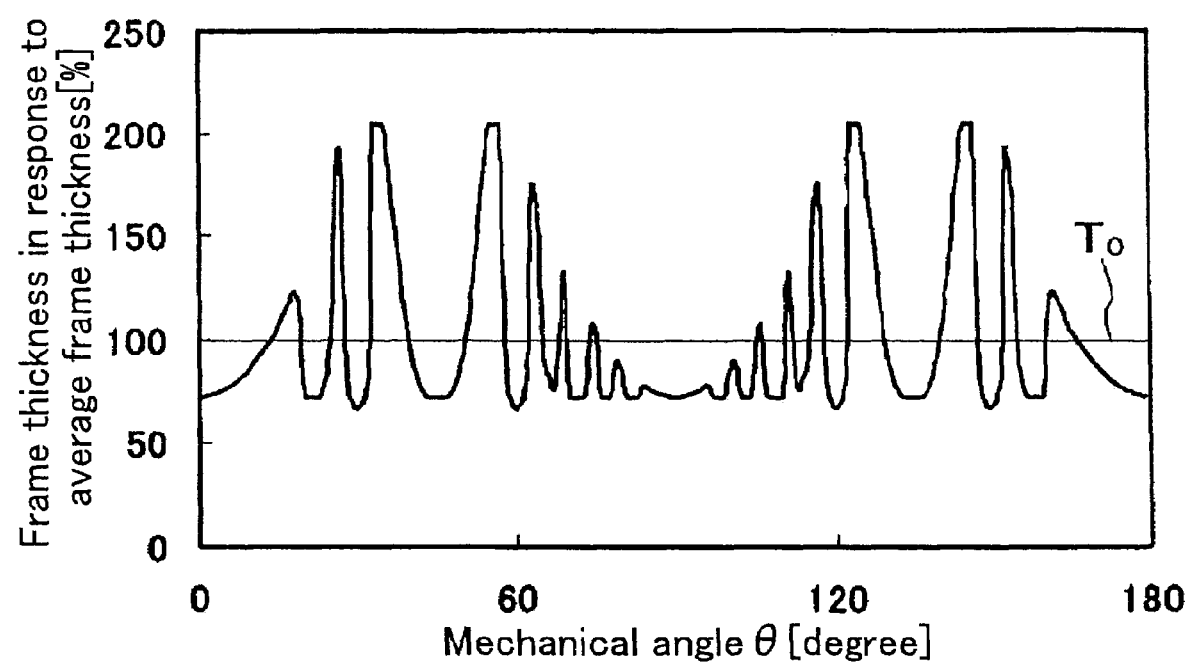
FIG. 15 is a curve graph, according to Embodiment 1 of the present invention, representing a percentage of effective frame thickness T(θ) at each frame-position θ in response to frame-average-thickness of the frame in FIG. 4.

A relationship between a position of the frame (angle $\theta$) and thickness of the frame $T(\theta)$ is illustrated in FIG. 7. Here, in a case in which spaces such as holes are provided on the frame 20, regarding the frame thickness of these portions, the thinnest portion, that is, the shortest distance from the inner circumference of the frame 20 to each of the holes is defined as the frame thickness. When spaces are provided in the frame 20, in adding compressing stress to the stator due to heat shrinkage of portions lying outward from the spaces, an influence on the stator becomes slight, because deformation of the frame can easily take place at the spaces. Although, as far as the portions exist around the spaces, of course, the influence cannot be reduced to nil, this contribution becomes far much less comparing to a case in which the spaces don't exist; therefore, its contribution can be neglected for convenience.

As apparent from FIG. 7, an angle $\theta$ representing a position of the frame 20 is a mechanical angle, around the inner circumference center o of the frame 20, from a reference line that connects the center o with an arbitrary point R0 other than the center. That is, in a case in which a line connecting the center o of the inner circumference of the frame 20 with an arbitrary point R0 other than the center is made to be a reference line, for example, the frame thickness at a point R2 on the frame 20 is represented by $T(\theta 2)$, using an angle $\theta 2$ that is formed by a line connecting the center o with the point R2 counterclockwisely rotated with respect to the reference line. In FIG. 7, as positions (angles $\theta$) on the frame, for example, four points, such as $\theta 1$, $\theta 2$, $\theta 3$, and $\theta 4$ (corresponding to R1, R2, R3, and R4, respectively), are represented.

Percentages of the frame thickness ($T(\theta)$) at each of frame positions ($\theta$) to the average thickness $T_0$ of each frame in FIG. 1-FIG. 4 are represented in FIG. 8-FIG. 11. Here, in FIG. 8-FIG. 11, considering the symmetric property of the frames, only the values at mechanical angles not more than 180° (180 degrees) are represented. FIG. 8-FIG. 11. represent that the frame thickness differs according to the position (angle $\theta$) on the frame, and varies in a range of approximately 50%-250% of the average thickness $T_0$ of the frame.

Meanwhile, when the frame 20 is contractedly set into the stator (stator core 21) by the heat-shrink fitting method, etc., force A interactively acts on the contact portion between the frame 20 and the stator. Providing that this force A is an internal pressure A, and given that an internal diameter of a thick walled cylinder is $r_1$, and its external diameter is $r_2$, radial stress V operating on a portion of the radius r is well known to be represented by the following equation.

$$V = \frac{Ar_1^2\left(1 - \frac{r_2^2}{r^2}\right)}{r_2^2 - r_1^2}$$

That is, because the radial stress is found to be inversely proportional to $r^2$, the stress immediately decreases with r being made close to the outer diameter $r_2$. That is to say, even if at a portion in which r becomes large the frame shape slightly changes, the internal pressure A, that is, the external pressure A to the stator core 21, is not affected.

Thus, in this embodiment, as an effective frame thickness, the followings are defined. The effective frame thickness is a frame thickness in that the irregularity of the frame thickness is considered to comparably effect on the magnetic-characteristic distribution of the stator core 21. In this embodiment, given that the average thickness of the frame is $T_0$, when the frame thickness is not less than $2T_0$, the frame thickness is defined to be $2T_0$.

This result means that, when the frame 20 has, for example, a connecting portion for fixing the frame to another part, or has fins for radiating heat, frame portions protruded apart from the outer edge of the stator core 21 scarcely give compression force to the stator core 21. In order to neglect these frame portions, the frame thickness has been made to be $2T_0$. Hereinafter, the frame thickness given by this replacement is referred to as the effective frame thickness $T(\theta)$. That is, if these frame portions are not neglected, due to the shapes of the frame portions that are, for example, outwardly protruded from the outer edge of the stator core 21, and originally should not effect on the cogging torque, focused order components of the Fourier series expansion coefficients as described later increase; consequently, it is concerned that, for example, the ratio of the focused order components of the Fourier series expansion coefficients needed for evaluating how the frame thickness affects the cogging torque becomes unable to be discussed. Consequently, by limiting the frame thickness value as described above, instead of an actual frame thickness, the order-analysis accuracy according to the Fourier series expansion for the shapes of the frame 20 can be improved.

When the effective frame thickness is defined as described above, percentages of the effective frame thickness $T(\theta)$ at each of frame positions $\theta$ to the average thickness of the frames (the average value of the effective frame thickness) in FIG. 1-FIG. 4 are represented in FIG. 12-FIG. 15.

Next, in order to investigate a correlation between each of the components of the frame thickness (effective frame thickness) and the cogging torque, the Fourier series expansion for the frame thickness (effective frame thickness) has been performed. According to the Fourier series expansion, frame thickness (effective frame thickness) $T(\theta)$ at an angle $\theta$ is given by the following equation.

$$T(\theta) = \sum_{n=0}^{\infty} T_n \cos(n\theta + \phi_n) \qquad (1)$$

Where n is 0, 1, 2, 3, ..., $T_n$ is the magnitude of the n-th component of the frame thickness when $T(\theta)$ is expanded in the Fourier series as in equation 1, and $\phi_n$ is the phase thereof. Moreover, when the difference between the number of the stator slots Ns (=12) and the number of the rotor magnetic poles Np (=8) is k (=|Ns-Np|=4), the sum P of inclusion ratios for the k-th (=4th) component $T_k$ and the Np-th (=8th) component $T_{Np}$ can be expressed by the following equation.

$$P = (T_k + T_{Np}) \Big/ \sum_{n=0}^{\infty} T_n \times 100[\%] \qquad (2)$$

Figure 16:
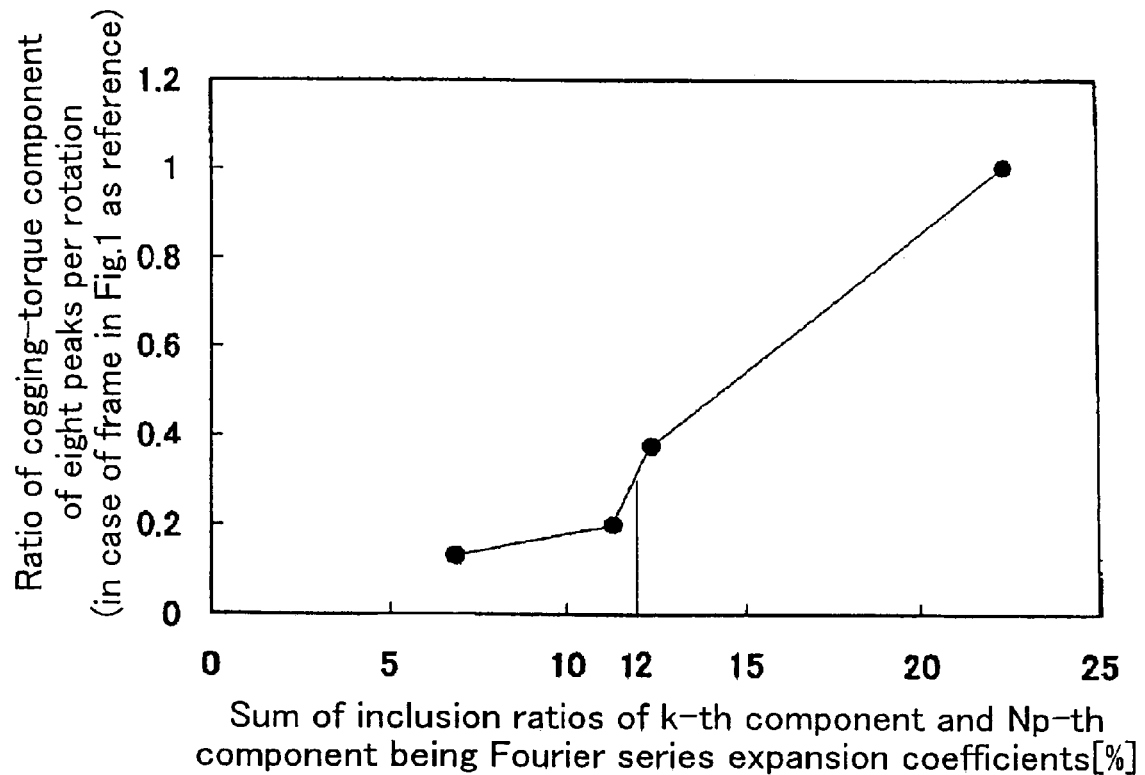
FIG. 16 is a curve graph, according to Embodiment 1 of the present invention, representing a relationship between the sum P of inclusion ratios $T_k$ for the k-th component and $T_{Np}$ for the Np-th component of the effective frame thickness, and a cogging-torque component related to eight peaks per rotation.

In FIG. 16, relationships between the sum P of the inclusion ratios of the k-th (4th) component $T_k$ of the effective frame thickness and the Np-th (8th) component $T_{Np}$, and the cogging-torque component of eight peaks per rotation are represented. Here, in table 1 and FIG. 16, the cogging-torque component of eight peaks per rotation is represented by ratios when the frame 20 in FIG. 1 is made to be a reference.

TABLE 1

| Frame shape | FIG. 1 | FIG. 2 | FIG. 3 | FIG. 4 |
|---|---|---|---|---|
| Sum of inclusion ratios of 4th and 8th components based on frame thickness [%] | 22.4 | 12.3 | 11.2 | 6.8 |
| Sum of inclusion ratios of 4th and 8th components based on effective frame thickness [%] | 22.4 | 12.4 | 11.4 | 6.9 |
| Ratio of cogging-torque eight-peak components (when frame in FIG. 1 made to be reference) | 1.0 | 0.4 | 0.2 | 0.1 |

It proves from table 1 and FIG. 16 that the cogging-torque component also increases in accordance with increasing the sum of the inclusion ratios of the 4th component and 8th component of the effective frame thickness; as a result, the value P correlates to the cogging-torque component of eight peaks per rotation. Therefore, in order to reduce the cogging-torque, the value P needs to be reduced as much as possible.

That is, in a rotary electric machine having rotor magnetic poles whose number Np is 8 and stator slots whose number Ns is 12, according to this embodiment, by reducing the sum of the inclusion ratios of the 4th component (the component of the difference between the number of poles and the number of the slots, that is, the k-th component), and the 8th component (the Np-th component) as much as possible, the cogging-torque component of eight peaks per rotation is found to be preventable. Moreover, in FIG. 16 related to the embodiment, when the sum P of the inclusion ratios of the 4th component and 8th component of the effective frame thickness is approximately not more than 12%, the cogging-torque component of eight peaks per rotation is found to drastically decrease.

Moreover, in this embodiment, because the frame 20 has stress-relieving spaces that are disposed so as not to have a rotational symmetry of 90 degrees, that is, the frame 20 is configured so that the 4-th component of the frame thickness (the effective frame thickness) is not given from point of shape, the 4-th component due to the rotational symmetry of 90 degrees is never added. As a result, the above described cogging torque can be reduced.

Here, although, in FIG. 16, a case in which the effective frame thickness is expanded in the Fourier series is represented, a case in which the actual frame thickness is expanded in the Fourier series may also be available. For example, in this embodiment, as represented in table 1, the sum of the inclusion ratios of the 4th component and 8th component in which the actual frame thickness is expanded in the Fourier series is approximately the same as that with little disparities, in which the effective frame thickness is expanded in the Fourier series. That is, in the frame shape according to this embodiment, the thickness is considered to be approximately equivalent to the effective thickness of the frame. In such a case, the actual frame thickness may be expanded in the Fourier series.

Hereinafter, the reason is explained in detail for which the frame-thickness components of the stator core relating to the cogging torque due to the component of the number of the poles are a component of the difference between the number of the poles and the number of the slots, and a component of the number of the poles. Here, the "frame thickness" is assumed to mean the "effective frame thickness".

First, an explanation is given based on the reference (Gotou, Kobayashi; "An Analysis of the Cogging Torque of a DC Motor and a New Reducing Technique", IEEJ Transactions on Power and Energy, Vol. 103-B, p711-718 (1983)). In a case in which the armature function does not have a symmetry (an ideal state), as disclosed in the above reference, cogging torque of components in response to the least common multiple of the number of the poles and the number of the slots generates. Therefore, in this embodiment, a case is explained in which variation in the armature function (the stator permeance) occurs due to the irregularity of the frame thickness.

First, similarly to the above reference, the field function is given by $$F^2(\varphi) = X_0/2 + \sum_{n=1}^{\infty} X_{np}\cos(nP\varphi + x_{np}) \tag{3}$$

where P is the number of the poles ($X_0$, $X_{np}$, etc. are the same as those in the reference).

Next, considering that the variation of the armature function (the stator permeance) occurs due to the irregularity of the frame thickness, the armature function is expressed by the following equation.

$$A(\varphi) = \left\{E_0 + \sum_{m=1}^{\infty} E_m\cos(mS\varphi + \varepsilon_m) + E_k\cos(k\varphi + \gamma_k)\right\}^2 \tag{4}$$

Here, S is the number of slots, and k and $E_k$ are the number of pulses and amplitude per rotation of the permeance, respectively, that occurs due to the irregularity of the frame thickness. By expanding equation 4, $$\begin{aligned}
A(\varphi) &= \left\{E_0 + \sum_{m=1}^{\infty} E_m\cos(mS\varphi + \varepsilon_m)\right\}^2 + \\
&\quad 2\left\{E_0 + \sum_{m=1}^{\infty} E_m\cos(mS\varphi + \varepsilon_m)\right\}E_k\cos(k\varphi + \gamma_k) + \\
&\quad E_k^2\cos^2(k\varphi + \gamma_k) \\
&= Y_0/2 + \sum_{m=1}^{\infty} Y_{mS}\cos(mS\varphi + y_{mS}) + 2E_0E_k\cos(k\varphi + \gamma_k) + \\
&\quad 2E_k\sum_{m=1}^{\infty} E_m\cos(mS\varphi + \varepsilon_m)\cos(k\varphi + \gamma_k) + E_k^2\cos^2(k\varphi + \gamma_k) \\
&= \frac{1}{2}(Y_0 + E_k^2) + \sum_{m=1}^{\infty} Y_{mS}\cos(mS\varphi + y_{mS}) + \\
&\quad 2E_0E_k\cos(k\varphi + \gamma_k) + \frac{1}{2}E_k^2\cos 2(k\varphi + \gamma_k) + \\
&\quad E_k\sum_{m=1}^{\infty} E_m[\cos\{(mS+k)\varphi + \varepsilon_m + \gamma_k\} + \cos\{(mS-k)\varphi + \varepsilon_m - \gamma_k\}]
\end{aligned} \tag{5}$$

is obtained. Where, $$\left\{E_0 + \sum_{m=1}^{\infty} E_n\cos(mS\varphi + \varepsilon_m)\right\}^2 = Y_0/2 + \sum_{m=1}^{\infty} Y_m\cos(m\varphi + y_{mS})$$

(in response to the armature function in the ideal state)

is given. Because the first term and the second term in equation 5 are in the forms similar to those in equation 14 of the above reference, according to these terms, equation 3, and the following torque-calculation equation $$T(\theta) = -\frac{\partial}{\partial \theta}\int_0^{2\pi} \{F(\varphi)\}^2 \{A(\varphi-\theta)\}^2 d\varphi \qquad (7)$$

in a state of production-error-free machining, cogging torque in which the least common multiple is made to be a fundamental wave occurs (although the calculation method in detail is disclosed in the above reference, when nP≠mS, equation 6 becomes zero; consequently, the cogging torque does not occur. Meanwhile, when nP=mS, equation 6 has a value; consequently, the cogging torque occurs. Here, when nP=mS, the cogging torque occurs in which the least common multiple of the number of the poles and the number of the slots is made to be a fundamental-wave component.).

By the same consideration as given above:
A. By the third term in equation 5, equation 3, and equation 6, when k=nP, a cogging torque of the nP-th (the number of poles) component occurs.
B. Here, regarding the fourth term in equation 5, when pulses of the armature function (the penneance) that occur due to the irregularity of the frame thickness are assumed to be smaller than the fundamental wave components ($E_1$), etc. of the armature function, Bk can be assumed to be neglected.
C. By the fifth term in equation 5, equation 3, and equation 6, when nP=mS+k or nP=|mS−k|, that is, when k=|nP−mS| and k=nP+mS, cogging torque of the nP-th component occurs.

Considering that the fundamental wave component (n=m=1) is the main component, from A and C the component of the frame thickness due to the cogging torque of the P-th component can be understood to be the component of the number of the poles, or the difference between or the sum of the number of the poles and the number of the slots. That is, in a case of a motor in which the number of poles is 8, and the number of slots is 12, the component of the frame thickness related to the cogging torque of the vibration component (the pole component) having the eight-peaks-per-rotation includes the 4th, 8th, and 20th components. Meanwhile, regarding the components generated due to the irregularity of the frame thickness, because it is presumed that the lower order components are larger than the higher one, in the present invention, two components, that is, the component of the difference between the number of poles and the number of slots, and the component of the number of poles (the 4th component and the 8th component) are focused on.

As explained above, according to this embodiment, a rotary electric machine, in which the number of stator slots Ns is 12, and the number of rotor poles Np is 8, is configured by providing the stress-relieving spaces 201 and 202 that are disposed on the portion of the frame 20 so as not to have 90-degree mechanical angle rotational symmetry, so that the effective frame thickness T(θ) is, as given in equation 1, circularly expanded in the Fourier series at mechanical angle θ, around the inner circumferential center o of the frame 20, from the reference line connecting the center o with an arbitrary point R0 other than the center, and the sum P of each of inclusion ratios of the k-th (4th) component $T_k$ and the Np-th (8th) component $T_{Np}$ that are, as represented by equation 2, the Fourier series expansion coefficients of the effective frame thickness T(θ) falls under 12%; as a result, because the rotational symmetry of mechanical angle 90 degrees need not be provided, the degree of design flexibility increases, comparing with the conventional case in which the frame is made to be in a shape having fins, and the thickness of the frame main body at the bottom of the fins is made to be approximately regular; moreover, because a plurality of the deep fins need not be provided, and it becomes possible to make the average frame thickness thicker (than conventional one), the mechanical strength of the frame and its productivity can be improved. Additionally, the cogging torque can be reduced, which is caused by iron-core- magnetic circuit distortion generated due to the frame shape.

Here, although in the above description, the metal frame 20 is explained, the invention is not limited to this material, for example, ceramic-related or composite materials that has Young's modulus similar to that of the stator (the stator core 21) may be used. This applies to the following embodiments although not particularly described in any detail.

EMBODIMENT 2

Figure 17:
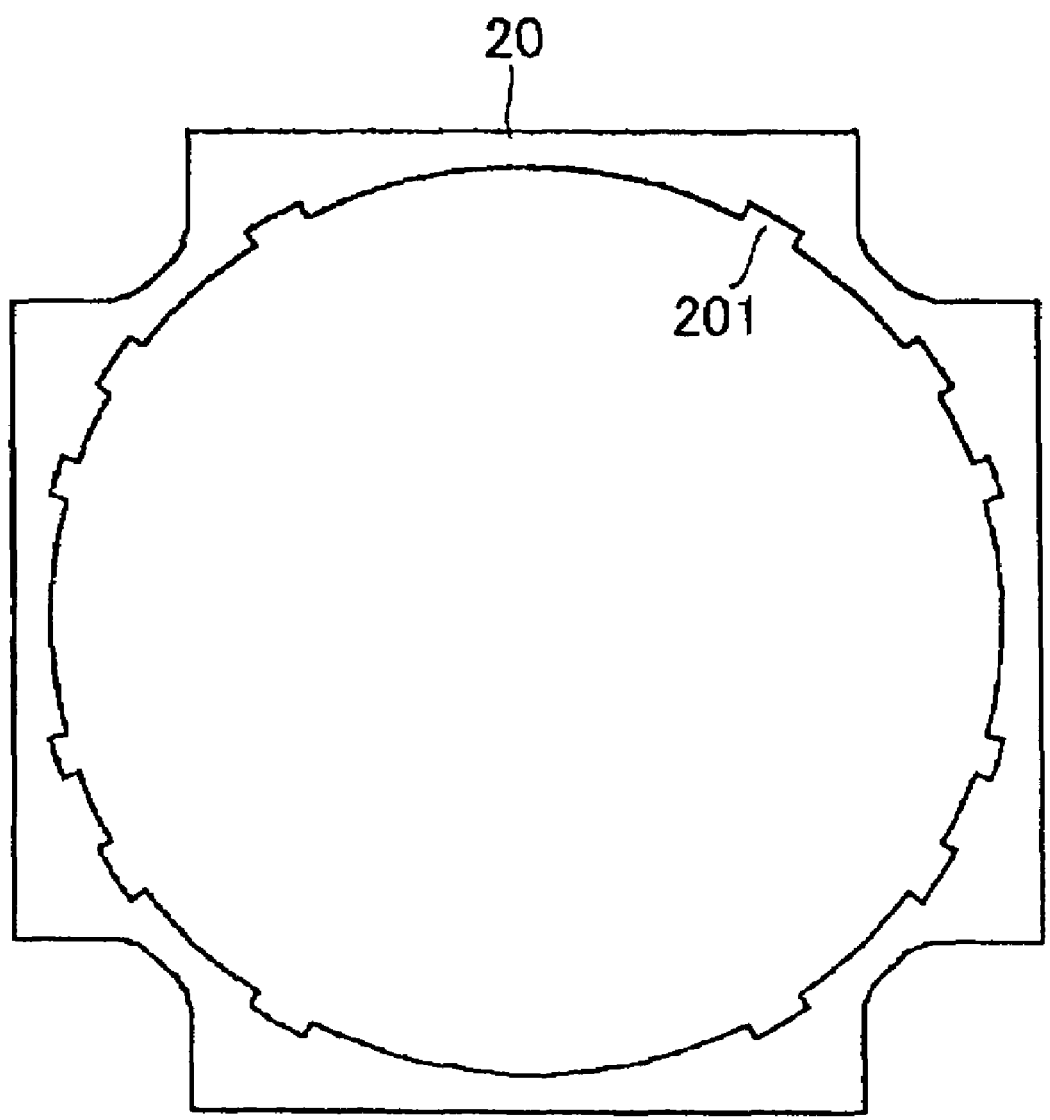
FIG. 17 is a front view illustrating an example of a frame according to Embodiment 2 of the present invention.

FIG. 17 is a front view illustrating an example of a frame according to Embodiment 2 of the present invention. Although, in Embodiment 1, the stress-relieving grooves 201 were provided at the outer edge of the frame as an example of the stress-relieving spaces, by providing the stress-relieving grooves 201 at the inner circumference of the frame as in this embodiment, the k-th component ($T_k$) and Np-th component ($T_{Np}$) among the Fourier series expansion coefficients with respect to the effective frame thickness can also be reduced; consequently, the sum of these inclusion ratios can be considered to be reduced.

Here, as the stress-relieving spaces, the stress-relieving grooves 201 provided at the outer edge of the frame and the stress-relieving holes 202 provided on the frame represented in Embodiment 1, and the stress-relieving groove 201 provided at the inner circumference of the frame represented in this Embodiment, needless to say, may be mixedly provided.

EMBODIMENT 3

Figure 18:
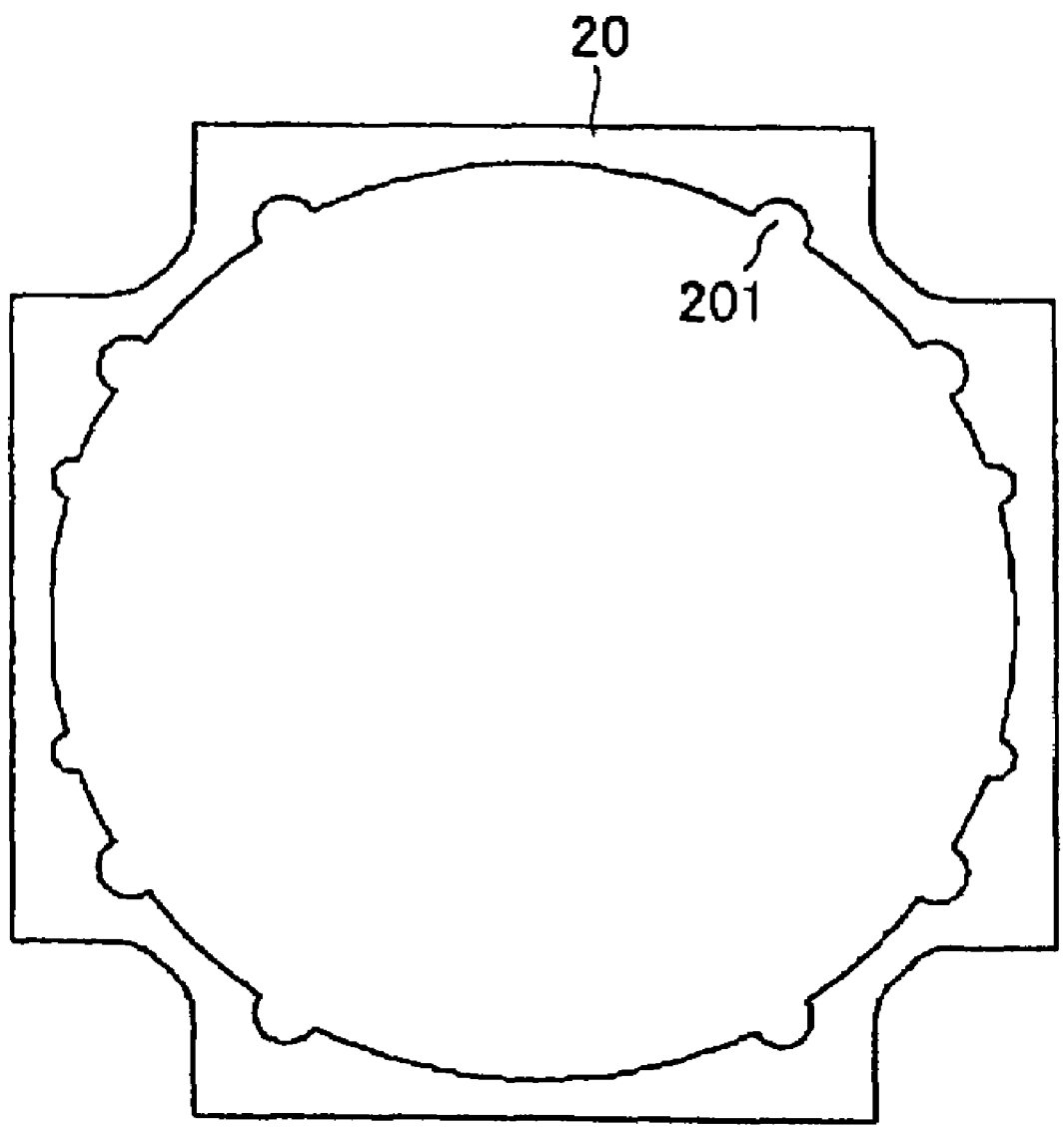
FIG. 18 is a front view illustrating an example of a frame according to Embodiment 3 of the present invention.

FIG. 18 is a front view illustrating an example of a frame according to Embodiment 3 of the present invention. Although, in each of Embodiments described above, a case in which the cross-section of the stress-relieving grooves 201 in a plane that is orthogonal to the rotor rotating shaft (or the center axis of the frame inner circumference) is rectangular has been represented, as in this Embodiment, by making at least a part of the stress-relieving grooves 201 in the above plane to be in a curved shape such as a half circular or an approximately half ellipsoidal shape, excessive stress concentration at the stress-relieving grooves 201 is considered preventable.

Moreover, similarly, as represented in Embodiment 1, by making at least a part of the stress-relieving holes 202 in a plane, which is orthogonal to the centering axis of the frame inner circumference, to be in a curved shape such as a circular or an approximately ellipsoidal shape, excessive stress concentration at the stress-relieving holes 202 can be considered preventable.

EMBODIMENT 4

Figure 19:
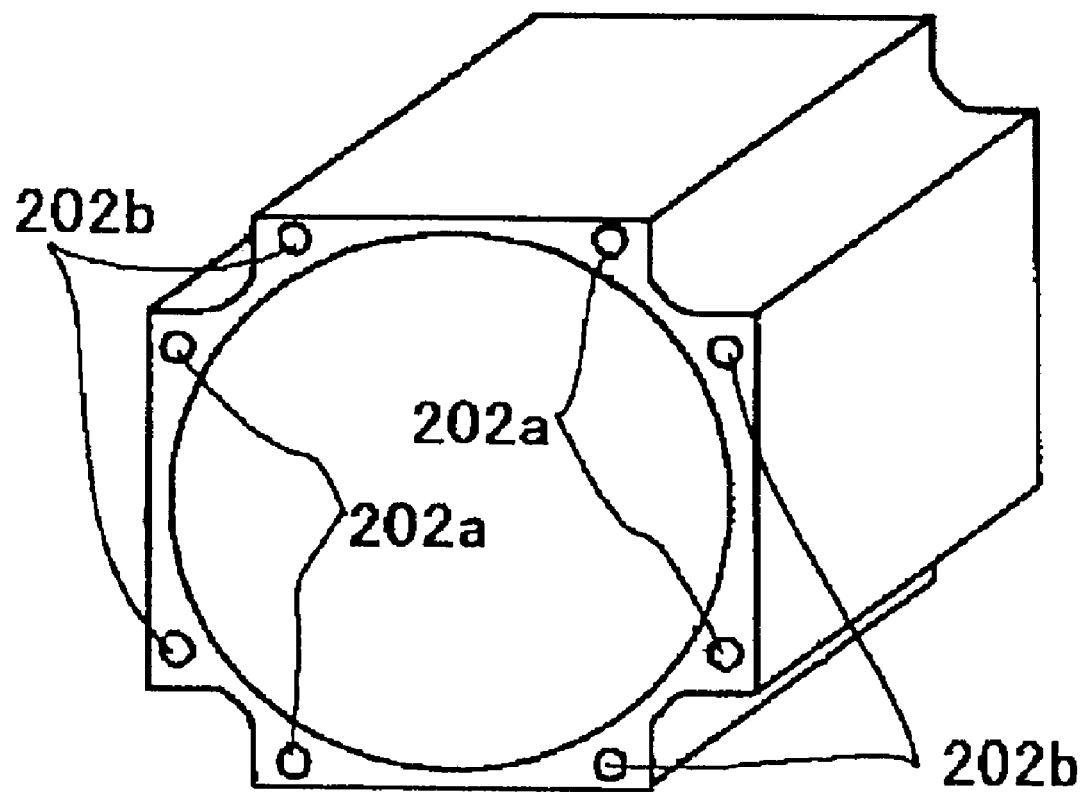
FIG. 19 is a perspective view illustrating an example of a frame according to Embodiment 4 of the present invention.
Figure 20:
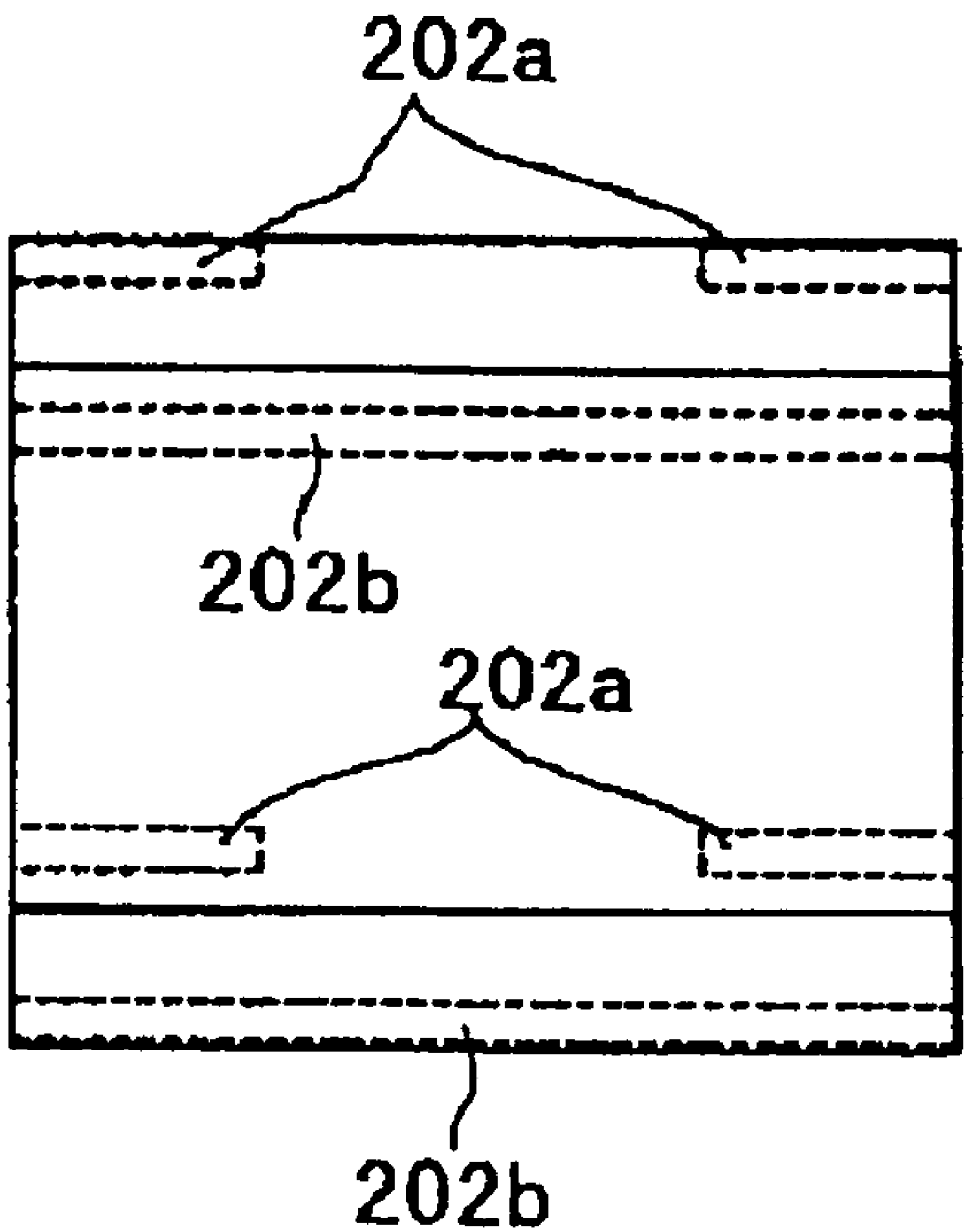
FIG. 20 is a side view illustrating the example of the frame according to Embodiment 4 of the present invention.

FIG. 19 and FIG. 20 are a perspective view and a side view, respectively, illustrating an example of a frame according to Embodiment 4 of the present invention. In this embodiment, as represented in these figures, through holes 202*b* and non-through holes 202*a*, as the stress-relieving holes, that are drilled through the frame member and not drilled therethrough, respectively, are mixedly provided. As a result, according to the thickness of the frame 20, that is, positions in a rotatory axis direction, the inclusion-ratio distribution of the number of the focused orders among the Fourier series expansion coefficients with respect to the frame thickness can be controlled. Therefore, the components, other than the k-th component and the Np-th component (the 4th and 8th components, respectively), among the Fourier series expansion coefficients with respect to the effective frame thickness that is related to the cogging torque obtained as the average value in a rotatory axis direction can be controlled to (tend to) increase; consequently, the inclusion ratios of the k-th component and the Np-th component among the Fourier series expansion coefficients with respect to the effective frame thickness can be considered to be reduced, so that cogging torque can be further reduced.

Similarly, as the stress-relieving grooves 201, through-grooves (passing through the frame member) leading from one end to the other end of the frame member, and non-through-grooves (not passing through the frame member) made for only a portion between one end to the other end of the frame member may be mixedly provided; consequently, the effect similar to the case above described can be obtained.

Moreover, in embodiments 1-4, the outer shape of the cross-section that is orthogonal to the center axis of the inner circumference of the frame 20 is made approximately square; however, as described in detail in Embodiment 1 in order to discuss the orders of the expansion coefficients when the frame thickness is expanded in the Fourier series as expressed by equation 4, the outer shape of the frame may be rectangular other than square, such as polygonal, or elliptical. That is, given that the number of the stator slots is Ns, the number of the rotor magnetic-poles is Np, and the difference between those is k(=|Ns−Np|), the frame needs to be configured in such a way that the stress-relieving spaces disposed so as not to have the 90-degree mechanical angle rotational symmetry in the part of the frame are provided, so that the sum P of each of inclusion ratios of the k-th component $T_k$ and the Np-th component $T_{Np}$ of the Fourier series expansion coefficients in the effective frame thickness $T(\theta)$ expressed by equation 2, falls smaller than 12%.

What is claimed is:

1. A rotary electric machine comprising:
   a frame;
   a stator whose stator-slot number Ns is 12;
   a rotor whose rotor-pole number Np is 8, the rotor and being disposed inside the stator wherein,
   the frame has a frame thickness $T(\theta)$ at mechanical angle $\theta$, with respect to a reference line that connects an inner circumferential center of the frame with an arbitrary point, other than the center, and the frame thickness around the center is circularly expanded in a Fourier series as expressed by equation (1), $$T(\theta) = \sum_{n=0}^{\infty} T_n \cos(n\theta + \phi_n) \quad (1)$$

(where n is 0, 1, 2, 3, . . ., $T_n$ is the magnitude of the n-th component of the frame thickness when $T(\theta)$ is expanded in the Fourier series as in equation (1), and $\phi_n$ is phase),
   the difference between the stator-slot number Ns and the rotor-pole number Np is k (k=|Ns−Np|), and
   stress-relieving spaces are located in portions of the frame in an arrangement that does not have 90-degree mechanical angle rotational symmetry, in such a way that the sum P of inclusion ratios for the k-th component $T_k$ and the Np-th component $T_{Np}$, which are the Fourier series expansion coefficients for the frame thickness $T(\theta)$ expressed by equation (2)

$$P = (T_k + T_{Np}) \bigg/ \sum_{n=0}^{\infty} T_n \times 100[\%], \quad (2)$$

is less than 12%.

2. The rotary electric machine as recited in claim 1, wherein effective frame thickness is replaced with $2T_0$ when the frame thickness $T(\theta)$ is not smaller than $2T_0$, and then the effective frame thickness, instead of the frame thickness, is circularly expanded in the Fourier series, where $T_0$ is the average frame thickness.

3. The rotary electric machine as recited in claim 1, wherein the stress-relieving spaces are at least either stress-relieving grooves located on the outer and inner circumferences of the frame, or stress-relieving holes located in the frame.

4. The rotary electric machine as recited in claim 1, wherein at least a portion of the cross-section of the stress-relieving spaces in a plane orthogonal to the center axis of the frame inner circumference is shaped in a curved line.

5. The rotary electric machine as recited in claim 1, wherein the stress-relieving spaces mixedly include holes that are drilled through the frame member and holes not drilled therethrough.

6. The rotary electric machine as recited in claim 1, wherein the contour of the frame in a cross-sectional plane orthogonal to the center axis of the frame inner circumference is approximately square.

* * * * *